(No Model.)

S. D. STROHM.
METALLIC CIRCUIT FOR ELECTRICAL CURRENTS.

No. 267,278. Patented Nov. 7, 1882.

WITNESSES:
Wm. H. Powell.
Jos. B. Connolly

INVENTOR
Samuel D. Strohm,
By Connolly Bros.,
ATTORNEYS

UNITED STATES PATENT OFFICE.

SAMUEL D. STROHM, OF PHILADELPHIA, PA., ASSIGNOR, BY MESNE ASSIGNMENTS, OF ONE-THIRD TO EDWARD C. SNYDER, OF SAME PLACE.

METALLIC CIRCUIT FOR ELECTRICAL CURRENTS.

SPECIFICATION forming part of Letters Patent No. 267,278, dated November 7, 1882.

Application filed April 6, 1882. (No model.)

*To all whom it may concern:*

Be it known that I, SAMUEL D. STROHM, a citizen of the United States, residing at Philadelphia, in the county of Philadelphia and State of Pennsylvania, have invented certain new and useful Improvements in Metallic Circuits for Electrical Currents; and I do hereby declare the following to be a full, clear, and exact description of the invention, reference being had to the accompanying drawings, which form part of this specification, in which—

Figure 1:
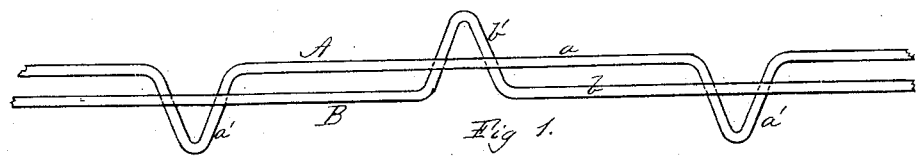
Figure 2:
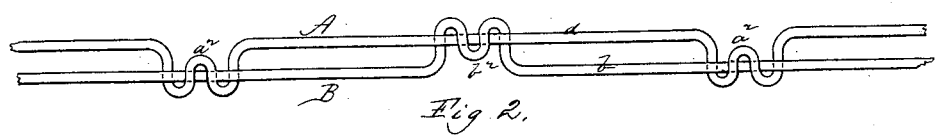
Figure 3:
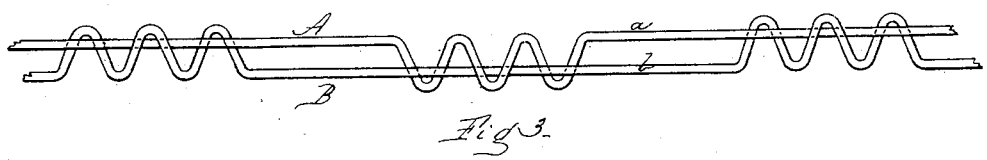

Figure 1 is a plan showing construction of wires before being interlocked. Fig. 2 is a plan showing the wires looped or interlocked. Fig. 3 is a modification showing the corrugations in groups, the straight portions of the wires passing on alternate sides thereof.

My invention relates to conductors for electric currents, and has for its twofold object to maintain the wires forming such circuits at a fixed relative distance for a part of their length by means of a fastening composed of the wires themselves, and to prevent the ill effects of absolute parallelism by causing the wires to cross each other at short intervals.

My improvements consist in the peculiar construction and combination of parts, hereinafter set forth, comprising two wires arranged to run parallel for portions of their length, and formed with corrugations or loops at short intervals, which produce crosses and at the same time afford means for maintaining such wires in their fixed relative position. The wires so interlocked are intended to form the line-wire and return-circuit for a complete metallic circuit.

Referring to the accompanying drawings, A and B represent two conductors composed of insulated wires, and adapted and designed to form a metallic circuit. Each of the wires is straight in parts, such parts being indicated by the letters $a$ and $b$, and each is formed at short intervals with corrugations or loops $a'$ $b'$, as shown in Fig. 1. The wires being thus first constructed are laid side by side, each one passing over or crossing the loops of the other. While thus located the tops of said loops are bent over the wires resting upon them, forming short curves or fastenings $a^2 b^2$, said curves trending in opposite directions alternately, so as to inclose the wires on two sides and prevent their coming apart. The corrugations or loops, bent over as described, not only serve as fastenings to hold the wires at the proper relative distance apart, but also cause such wires to cross upon one another, thus preventing injurious inductive effects in the circuit, and avoiding the induction of a current in either from a neighboring conductor running in the same direction.

I am aware that it is not new to interlock conductors for the purpose of preventing induction. Hence I do not broadly claim interlocked or intertwined conductors.

What I claim as my invention is as follows:

1. A metallic circuit composed of the wires A B, straight for a part of their length, and having corrugations at intervals to form rests for the straight portions of other like wires, such straight parts of each wire being in the same line, substantially as shown and described.

2. The combination of two wires, A B, forming a metallic circuit for electrical purposes, each of said wires having straight portions $a$ $b$ and corrugations or loops $a'$ $b'$, said wires being combined and arranged, substantially as described, with their straight portions parallel, their corrugations forming crosses and affording means for keeping said wires in a fixed relative position, as set forth.

In testimony that I claim the foregoing I have hereunto set my hand this 5th day of April, 1882.

SAMUEL D. STROHM.

Witnesses:
ANDREW ZANE, Jr.,
M. D. CONNOLLY.